United States Patent [19]

Stall

[11] Patent Number: 4,773,127

[45] Date of Patent: Sep. 27, 1988

[54] METHOD AND APPARATUS FOR SHIRRING FOOD CASINGS

[75] Inventor: Alan D. Stall, Naperville, Ill.

[73] Assignee: Viskase Corporation, Chicago, Ill.

[21] Appl. No.: 115,721

[22] Filed: Nov. 2, 1987

[51] Int. Cl.[4] .............................................. A22C 13/02
[52] U.S. Cl. ......................................... 17/45; 17/49; 17/1 R; 17/41
[58] Field of Search ...................... 17/1 R, 49, 41, 42, 17/45

[56] References Cited

U.S. PATENT DOCUMENTS 2,583,654 12/1947 Korsgaard .
3,115,669 11/1956 Matecki .
3,766,603 10/1973 Urbutis et al. .
4,052,770 10/1977 Asquith .
4,547,932 10/1985 Romeike et al. .
4,578,842 4/1986 Urbutis .

FOREIGN PATENT DOCUMENTS 2102267 3/1985 United Kingdom .

Primary Examiner—Willie G. Abercrombie
Attorney, Agent, or Firm—Roger Aceto

[57] ABSTRACT

A shirring method and apparatus for shirring food casing in which the casing is shirred directly onto a sleeve which moves longitudinally through the shirring mechanism from a first position to a second position until a desired length of shirred casing is accumulated on the sleeve. The sleeve is held at its second position and the shirred casing is removed from the sleeve in the direction of shirring and thereafter the sleeve is returned to its first position.

15 Claims, 2 Drawing Sheets

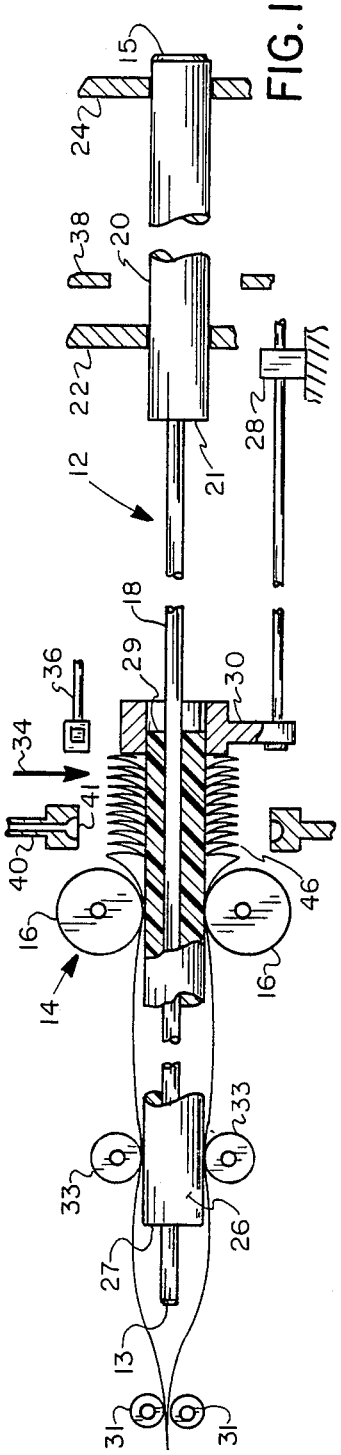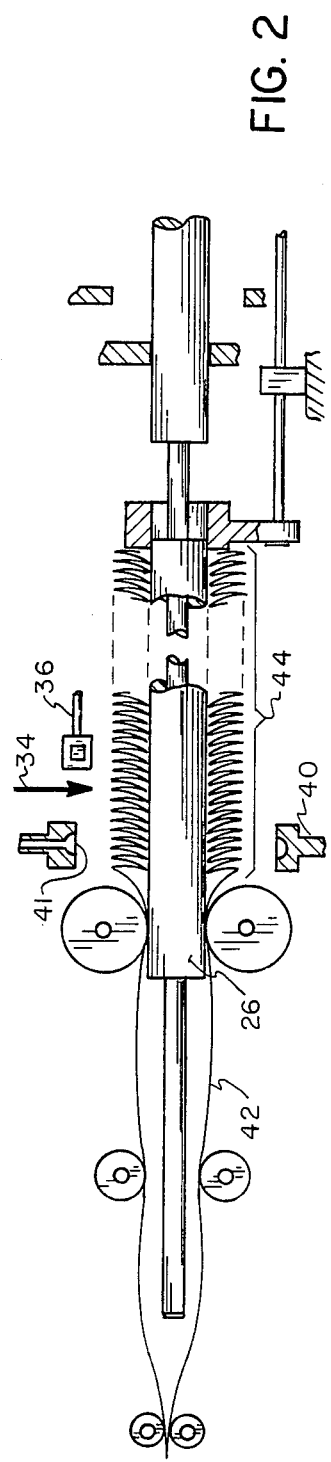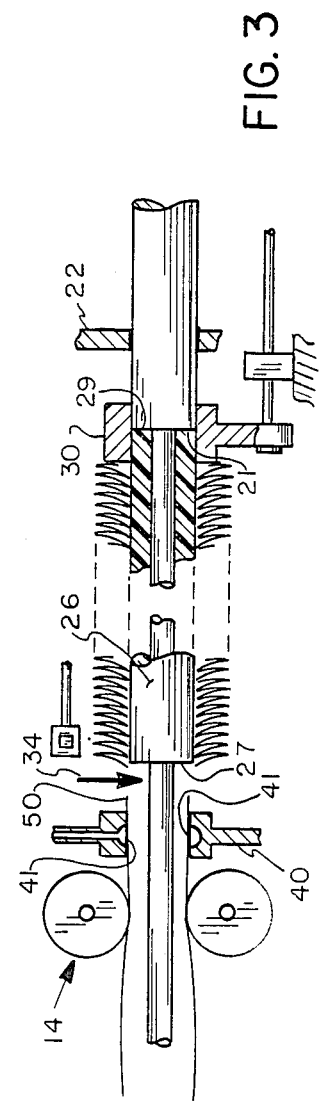

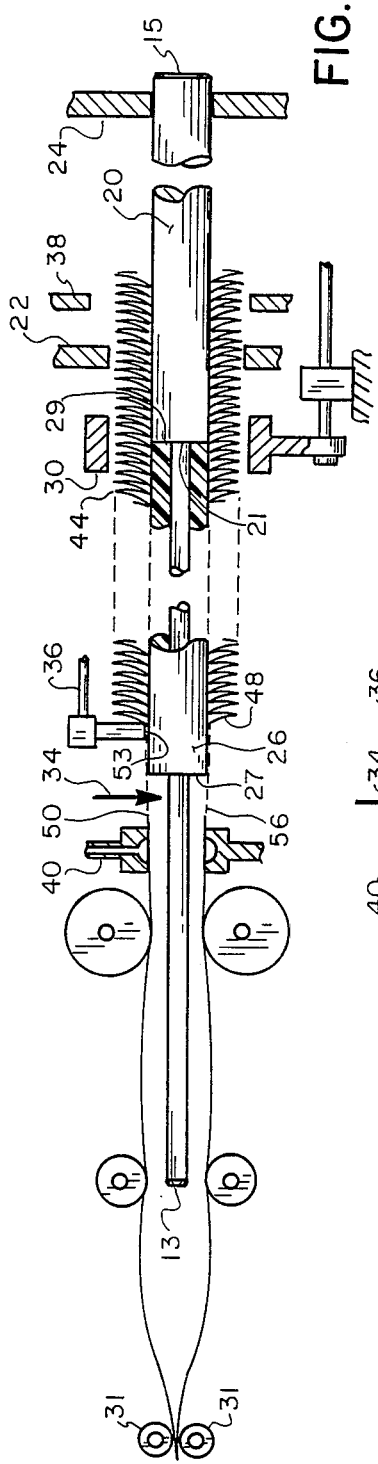
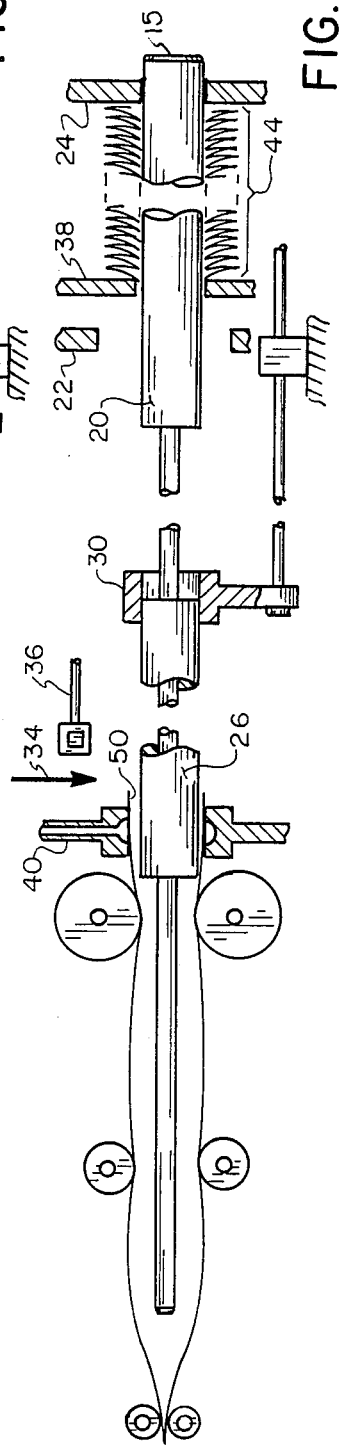
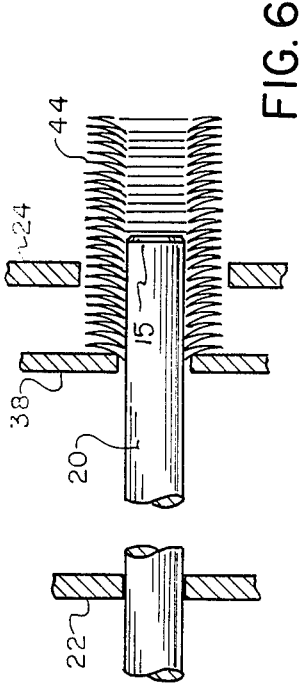

METHOD AND APPARATUS FOR SHIRRING FOOD CASINGS

TECHNICAL FIELD

The present invention relates to a method and apparatus for shirring a food casing.

BACKGROUND OF THE INVENTION

Shirred food casings are well known in the art. In a shirring process a relatively long length of tubular casing is gathered into pleats which nest or pack one against another to form what is commonly known in the art as a "shirred stick". Shirred sticks are then used by meat packers in the production of sausage-type products, or the like, wherein the casing is deshirred and drawn from the stick during stuffing. The advantages to the meat packer of having casing in the form of a shirred stick is that a stick contains a relatively long length of casing so that the stuffing of a plurality of products can proceed without interruption. For example, a shirred stick 60 cm long may contain upwards of 60 meters or more of casing. The ratio of casing length to the length of the shirred stick is commonly referred to as "pack ratio".

Generally, either of two types of machines are used for commercial production of shirred sticks. In both machines the casing to be shirred is inflated and fed onto a shirring mandrel over a first end and then along the mandrel to a shirring mechanism. The shirring mechanism which is disposed about the mandrel gathers the casing into pleats to form the shirred stick. The pleats are formed tight to the mandrel so that the outside diameter of the mandrel determines the bore diameter of the shirred stick. The feature which epitomizes the difference between the two types of commercial shirring machines is the operation of the shirring mandrel and in particular, the manner in which it is supported.

One type of shirring machine, commonly referred to as a "floating mandrel" machine, is described in U.S. Pat. No. 3,766,603. In a floating mandrel machine the mandrel is supported by a plurality of clamps at a fixed longitudinal position relative to the shirring mechanism. These clamps are arranged to open and close at defined intervals in the shirring cycle so that at any given instant the mandrel is supported by at least one of the clamps. On the floating mandrel machine the pleats of shirred casing pass from the shirring mechanism and progress longitudinally along the mandrel. After a given length is shirred to form a stick, it is separated from the unshirred casing and moved farther along the mandrel to a compaction station. At the compaction station forces are exerted against one or both ends of the shirred stick to compress or reduce its overall length. Thereafter the compacted stick is moved still farther along the mandrel and is eventually doffed from the second end of the mandrel. Thus, in the operation of a floating mandrel machine the casing to be shirred is fed onto one end of the mandrel and the shirred stick is doffed from an opposite end of the mandrel.

A second type of machine is referred to as a "withdrawing mandrel" machine. In a withdrawing mandrel machine, as described in U.S. Pat. No. 2,583,654, the shirring mandrel is supported for longitudinal movement relative to the shirring mechanism. At the start of the shirring operation, the mandrel is extended through the shirring mechanism. During shirring, the mandrel is withdrawn in a longitudinal direction from the shirring mechanism until a desired length of shirred casing has accumulated on the mandrel. The casing is then severed and the mandrel, together with the shirred casing it supports, is moved or otherwise indexed laterally to a second position where the shirred stick is compacted. After compaction the compacted stick and mandrel are again moved or indexed to a third position where the shirred stick is doffed from the first end of the mandrel. Thus, in a withdrawing mandrel machine the casing to be shirred is fed onto one end of the mandrel and the shirred stick is doffed from the mandrel over the same end.

Floating mandrel machines have the advantage of a relatively high production rate. Also the floating mandrel machine is more adaptable to a continuous feeding of the casing to the shirring mechanism than a withdrawing mandrel machine. Both advantages of the floating mandrel derive from the movement of the casing to be shirred onto one end of the mandrel and the doffing of the shirred stick from the opposite end of the mandrel. In this respect the sequence of steps of feeding the casing on to the mandrel, shirring the casing, compacting the shirred stick and doffing can all be performed at successive stations along the mandrel without an appreciable interruption in the production cycle. However, the primary disadvantages of the floating mandrel machine is that the shirred casing must move relative to the mandrel in order to accumulate a length of shirred casing. Since the pleats are formed tight to the mandrel, the resistance to such movement increases as casing accumulates and this impedes the shirring operation.

The primary advantage of a withdrawing mandrel machine is that on balance it shirrs casing easier and it often produces a better product in terms of bore size and appearance than a floating mandrel machine. Bore size of the stick is important. Generally a meat packer desires to use the largest possible stuffing horn diameter in stuffing the casing and the stick bore must be large enough to fit over the horn. However, as the bore size of the stick approaches the inflated diameter of the casing, it becomes more difficult to shirr the casing and the pack ratio decreases. Of the two type of machines the withdrawing mandrel machine generally is better able to shirr sticks where the required bore size of the shirred stick is large in relation to the casing inflated diameter.

These enhanced characteristics of sticks made on a withdrawing mandrel machine derive from the axial longitudinal movement of the mandrel relative to the shirring mechanism as casing is shirred. Longitudinally moving the mandrel allows the pleats of shirred casing which are formed tight to the mandrel to accumulate on the mandrel and pack one against another with little or no relative motion between the mandrel and the shirred casing. This lack of relative motion makes the casing easier to shirr. However, in a withdrawing mandrel machine the shirring operation must be interrupted to accommodate the separation of the shirred stick, the lateral movement of the mandrel so that the stick can be doffed and then the reinsertion of the mandrel through the shirring mechanism. This interruption slows production and is an impediment to continuous operation.

Accordingly, whether one elects to use a floating mandrel or a withdrawing mandrel depends upon a balancing of the relative advantages and disadvantages of each. On the one hand the floating mandrel machine has a higher production rate and is readily adaptable to continuous production. On the other hand, the withdrawing mandrel machine is better able to shirr the difficult-to-make sticks and can produce sticks having larger bore diameters than comparable sticks produced on a floating mandrel machine.

OBJECTS OF THE INVENTION

One object of the present invention is to provide a shirring method and apparatus having a production rate comparable to a floating mandrel machine while maintaining a stick quality comparable to sticks produced on a withdrawing mandrel machine.

Another object of the present invention is to provide a shirring method and apparatus which uses a fixed floating mandrel for producing sticks comparable in quality to sticks produced on a withdrawing mandrel machine.

A further object of the present invention is to provide a shirring method and apparatus utilizing a floating mandrel which supports a longitudinally movable member for accumulating shirred casing.

A yet further object of the present invention is to provide a shirring method and apparatus using a floating mandrel having a first section including a longitudinally moveable member for accumulating shirred casing, and a fixed axially aligned compacting section for receiving shirred casing pushed from the movable member.

A still further object is to provide a shirring method and apparatus wherein casing is fed onto a first end of a floating mandrel, is shirred and accumulated on a longitudinally moveable member supported by the mandrel, and then is doffed from the second end of the mandrel.

SUMMARY OF THE INVENTION

The present invention may be characterized by a shirring machine comprising
(a) a mandrel having a first end over which unshirred tubular casing is drawn for shirring and a second end from which shirred casing is doffed from the mandrel;
(b) a sleeve slidably disposed on said mandrel for longitudinal movement along said mandrel;
(c) shirring means disposed about said mandrel intermediate the ends thereof for shirring the unshirred tubular casing into pleats directly onto said sleeve;
(d) clamp means operable to hold said mandrel at a frxed longitudinal position relative to said shirring means during the shirring of the casing; and
(e) drive means for moving said sleeve longitudinally along said mandrel and through the shirring means in the direction of said mandrel second end at a rate sufficient to resist the free passage of pleats of shirred casing from said shirring means so that the pleats of shirred casing pack together and accumulate on said sleeve.

In its method aspect the present invention is characterized by a method of shirring food casing comprising the steps of:
(a) feeding unshirred tubular casing over a first end of a longitudinally fixed mandrel and along the mandrel to a shirring zone disposed intermediate the ends of the mandrel;
(b) shirring the casing into pleats in said shirring zone directly onto a sleeve which is slidably disposed on said mandrel;
(c) during said shirring step (b), longitudinally moving the sleeve through the shirring zone and along the mandrel in the direction of the mandrel second end at a rate sufficient to resist the free longitudinally passage of shirred casing pleats from the shirring zone and towards the mandrel second end so that the pleats pack together and a length of shirred casing accumulates on the sleeve;
(d) continuing said shirring of casing and longitudinally moving the sleeve until a desired length of shirred casing has accumulated on the sleeve; and then
(e) separating the accumulated length of shirred casing from the unshirred tubular casing and longitudinally removing the separated length of shirred casing from the sleeve in the direction of the mandrel second end.

In the present invention, the shirring machine has a mandrel which is fixed relative to a shirring mechanism as in a floating mandrel machine. The casing to be shirred is fed over a first end of the mandrel and along a first section of the mandrel to the shirring mechanism. Disposed on this first section of the mandrel is a sleeve. The sleeve is slidable along the mandrel and through the shirring mechanism.

During the course of shirring, the casing is shirred directly onto the sleeve and the sleeve is drawn longitudinally through the shirring mechanism and towards a second section of the mandrel so that a length of shirred casing accumulates on the sleeve. Because the sleeve slides along the mandrel during shirring, there is little or no relative movement between the shirred casing and sleeve during the time that shirred casing is accumulating on the sleeve.

After a desired length of shirred casing has accumulated, shirring is interrupted so the shirred length can be separated. The separated length of shirred casing is then moved longitudinally, in the same direction as shirring, off the sleeve and onto the second section of the mandrel. On the second section of the mandrel the separated length of shirred casing is compacted to reduce its length and then it is doffed in the direction of shirring, from the second end of the mandrel.

The separate operations of shirring and compaction are accomplished in sequence at successive stations along the length of the mandrel in that casing to be shirred is fed over a first end of the mandrel and a compacted shirred length of casing is doffed from a second end of the mandrel. This permits a substantially continuous operation interrupted only during the time needed to separate the shirred casing and to move it longitudinally from the sleeve and onto the compaction station. In addition, because the casing is shirred and accumulated on a sliding sleeve, the shirring operation is facilitated and sticks of better quality are produced without compromising the production rate.

DESCRIPTION OF THE DRAWINGS

FIG. 1 is a schematic representation partly broken away and in section showing a side view of the shirring apparatus of the present invention at the beginning of a shirring operation;

FIGS. 2-6 are views similar to FIG. 1 showing the sequence of steps in the shirring operation according to the method and apparatus of the present invention.

DETAILED DESCRIPTION OF THE INVENTION

FIG. 1 shows a shirring machine including a floating mandrel 12 which extends through a shirring head 14. The shirring head 14 is conventional and comprises a plurality of shirring rolls 16, usually three in number.

The shirring head defines a shirring zone between the first and second ends 13, 15 respectively of the mandrel in which the casing is gathered into pleats (shirred).

The floating mandrel 12 is provided with internal passages (not shown) for delivering air and/or various solutions through the mandrel first end 13 and into the casing being shirred, as is known in the art. The mandrel, as shown, has two sections, a compression section 20 and a necked section 18 extending longitudinally forward from the compression section. The juncture of the forward or necked section 18 with the rearward or compression section 20 defines a shoulder 21.

A pair of clamps 22, 24 support the floating mandrel at a fixed longitudinal position relative to the shirring head 14. These clamps open and close at controlled intervals so that, at any given time, one clamp or the other (or both) grips the compression section to support the mandrel.

Slidably disposed on the necked section 18 of the floating mandrel is an elongated sleeve 26. The sleeve has an outside diameter no smaller than the outside diameter of the compression section. The sleeve is slidable along the necked section 18 and through the shirring zone defined by shirring head 14. For reference purposes, the sleeve is considered in its forward or start position when its first end 27 is spaced forward or to the left of the shirring head 14 as shown in FIG. 1.

Releasably attached to the second end 29 of the sleeve is a gripper 30. The gripper is in the form of a split ring which closes to grip the sleeve (FIG. 1) and opens to release the sleeve (FIG. 4).

The gripper is operatively connected to a drive means 28. When the gripper is closed about the sleeve as shown in FIG. 1, the drive means is operable to draw the sleeve along the necked section 18 of the mandrel and towards the compression section 20 at a controlled and preferably constant rate.

Completing the shirring machine, as illustrated, are driven feed rolls 31 and a pair of guide rolls 33 for delivering casing to be shirred to the shirring head 14, and a compaction arm 38 for compacting the shirred casing and doffing it from the mandrel. Optional features include means 34 for severing the casing, a transfer arm 36 for moving shirred casing from the sliding sleeve and onto the mandrel compression section 20, and a vacuum clamp 40.

Operation of the apparatus will be described as starting with clamps 22, 24 in a closed position and with sleeve 26 in a forward position wherein substantially the major portion of the sleeve length is forward of the shirring rolls (FIG. 1). The casing 42 to be shirred is fed onto the floating mandrel over its first end 13 and is inflated in a conventional manner by air passing through passages in the floating mandrel. The inflated casing is drawn over the sliding sleeve 26 and through the shirring zone. In the shirring zone, the shirring rolls 16 gather (shirrs) the casing into pleats 46 directly onto sleeve 26 so the pleats are formed tight to the sleeve.

During shirring, drive means 28 is operated to longitudinally withdraw the sleeve 26 from between the shirring rolls 16 in a direction towards the mandrel second end 15 at a controlled rate sufficient to resist the free passage of pleats 46 from the shirring rolls 16. In this manner the advance of the shirred pleats 46 from the shirring rolls is retarded so the pleats on the sleeve are packed together and a length of shirred casing is accumulated on the sleeve 26 to form a shirred stick. The rate at which the sleeve is longitudinally moved through the shirring head 14 can be used to determine the shirred pack ratio or density of the stick. At a slow rate the shirred pack ratio will be higher than at a faster rate.

It is known in the art to twist or rotate the shirred stick about its longitudinal axis during shirring and advantages of such twisting is disclosed in U.S. Pat. No. 3,454,981, among others. If twisting the stick is desired, it can be accomplished by rotating the sleeve 26 by any suitable means (not shown) as it is being moved longitudinally through the shirring head 14. Since the pleats are formed tight to the sleeve, rotation of the sleeve will cause the stick to twist as it is being shirred.

Shirring and the controlled longitudinal withdrawal of sleeve 26 continues until a desired length 44 of shirred casing has accumulated on the sleeve (FIG. 2). At this point shirring is stopped and the shirred length of casing 44 is separated from the unshirred casing 42. Separation can be accomplished manually or by any suitable mechanical means which tears or cuts the casing.

In one separation method, as shown in FIG. 3, the first end 27 of the sleeve is moved beyond a cutting means 34. The cutting means 34, such as a blade, is then moved through the casing to sever it at a point intermediate the shirring head 14 and the end 27 of sleeve 26.

In order to transfer the severed length 44 of shirred casing from the sleeve, sleeve gripper 30 and clamp 22 are opened (FIG. 4). Transfer from the sleeve to the compaction section occurs when the second end 29 of the sleeve is butted against shoulder 21. The transfer is accomplished manually or by operation of a casing transfer arm 36 which is moved against the severed end 48 of the shirred casing 44 for pushing the severed length of shirred casing 44 off the sleeve 26 and onto the mandrel compaction section 20. In order to permit the movement of the shirred casing onto the mandrel compression section, the outside diameter of the compression section should be no larger than the outside diameter of the sleeve.

After the transfer to the compression section, the compression arm 38 is operated in a conventional manner to further compact the length of shirred casing 44 against mandrel clamp 24 (FIG. 5). Thereafter, the mandrel clamp 22 is closed and mandrel clamp 24 is opened to permit the compaction arm 38 to doff the compacted shirred casing from the second end 15 of the floating mandrel (FIG. 6).

At some point after the transfer of the shirred casing from the sleeve 26 is complete, the gripper 30 closes about the sleeve end 29 and drive means 28 is operated to return the sleeve 26 to its forward position (FIG. 1).

As set out hereinabove an optional feature of the shirring machine is a vacuum clamp 40. The vacuum clamp has one or more ports 41 and the casing is drawn against these ports when the vacuum clamp is evacuated (FIG. 3). This holds the casing so that severing means 34 can cut cleanly through the casing. The vacuum clamp 40 also operates to hold open the severed end 50 of the casing to facilitate the reinsertion of the sleeve 26 into the casing (FIG. 5) as the sleeve is moved back to its forward position at the start of the next shirring cycle.

It should be appreciated that separation of a shirred length 44 can be accomplished without the use of either a separate cutting means 34 or the optional vacuum clamp 40. For example, a cutting means can be incorporated into the transfer arm 36 or the arm itself can function as a means to separate the shirred length. Also, bringing the transfer arm 36 to bear against the end of the shirred length 44 and moving the arm to transfer the shirred length as shown in FIG. 4 can cause the shirred length to separate from the unshirred casing. Separation in this fashion is caused by longitudinally tensioning the unshirred casing between the transfer arm 36 and the nip at feed rolls 31 as the shirred length is moved by the transfer arm 36. The movement will eventually cause the tensioned unshirred casing to stretch and tear at a point 53 directly under or close to the transfer arm. As a result of separation in this fashion, a tail 56 of casing (shown in dotted line in FIG. 4) will remain extended onto the sleeve 26. Consequently, since the end 27 of the sleeve 26 remains extended into the casing, the return of the sleeve to its start position is facilitated and the optional vacuum clamp 40 is not needed.

EXAMPLE

To demonstrate the advantages of the present invention, a cellulosic casing was shirred on a machine having a sliding sleeve as illustrated in the Figures. The casing was a fibrous reinforced casing (fibrous casing) having a moisture content after shirring suitable for stuffing. Typically, the moisture content of such a casing is in the range of about 20-35% of total casing weight. The same size casing also was shirred on a prior art floating mandrel machine.

By means of a computer simulation, the data generated by these shirring operations was extrapolated to other sizes of casing and the results are set out in Table I.

Listed in Table I are four (4) sizes of casings. Both the inflated diameter and the recommended stuffed diameter is given for each casing. As noted above, each casing is a fibrous casing of the type suitable for stuffing without soaking and has a moisture content after shirring in the range of about 20-35% of total casing weight.

Each of these four casing sizes can be used with different size stuffing horns and the outside diameter of several horn sizes are listed for each casing size. Table I also sets out the length of casing (in feet) which may be shirred to a stick one foot long for use with a given horn. Two such lengths are given for each casing/horn size. The first length represents a length which may be shirred using the method and apparatus of the present invention (INV.) whereas, the length in parenthesis is a length which may be shirred using a prior art floating mandrel machine (F.M.).

TABLE I

| Casing Inf. Dia | Recommended Stuffed Dia | Horn O.D. | Ratio Of Horn O.D. To Casing Inf. Dia | Ft Of Casing In A One Foot Stick INV. | F.M. |
|---|---|---|---|---|---|
| 35.1 mm | 41 mm | 21 mm | .598 | 106 | (102) |
|  |  | 22 mm | .627 | 103 | (90) |
|  |  | 23 mm | .655 | 92 | (79) |
|  |  | 24 mm | .684 | 81 | (67) |
| 38.1 mm | 44 mm | 23 mm | .604 | 107 | (106) |
|  |  | 25 mm | .656 | 100 | (86) |
|  |  | 26 mm | .682 | 90 | (75) |
| 43.9 mm | 52 mm | 28 mm | .638 | 107 | (106) |
|  |  | 29 mm | .661 | 106 | (97) |
|  |  | 30 mm | .683 | 102 | (85) |
| 52.1 mm | 60 mm | 35 mm | .671 | 107 | (106) |
|  |  | 36 mm | .691 | 106 | (92) |
|  |  | 37 mm | .710 | 105 | (71) |

Comparison of the two casing length figures in Table I for each casing size and horn size combination shows that when the horn diameter is relatively smaell compared to the casing inflated diameter, the difference in the length of casing contained in the sticks is not significant. As horn size increases the bore of the shirred stick must increase so it can fit over the horn. Consequently Table I shows that as the ratio of the horn O.D. to the casing inflated diameter increases, the length of casing in each stick decreases. However, in each casing-horn size combination, the length of casing contained in sticks made using the method and apparatus of the present invention are shown to contain a longer length of casing than the sticks from a floating mandrel machine.

It is well known in the art that the actual length of casing contained in a shirred stick depends on a number of variables. These include, among others, the physical characteristics of the casing such as its flat width, wall thickness, extensibility and water content; the physical characteristics of the shirred stick to be made such as stick length and bore size required to fit over the stuffing horn on which the stick is to be used; and the shirring procedure itself such as the rate of shirring, the number and disposition of the teeth on the shirring rolls and whether special lubricants or other substances are applied to the casing during shirring.

However, the Table I data does illustrate the advantages to be derived from the present invention particularly in the production of shirred sticks having a relatively large bore size as compared to the inflated diameter of the casing. It should be appreciated that the casing lengths given in Table I are intended only to illustrate that there is a substantial improvement to be obtained when using the method and apparatus of the present invention versus a floating mandrel machine and actual lengths obtainable will vary depending upon the casing/stick/shirring variables as set out above.

Having thus described the invention in detail, what is claimed as new is:

1. A method of shirring food casing comprising the steps of:
    (a) feeding unshirred tubular casing over a first end of a longitudinally fixed mandrel and along the mandrel to a shirring zone disposed intermediate the ends of the mandrel;
    (b) shirring the casing into pleats in said shirring zone directly onto a sleeve which is slidably disposed on said mandrel;
    (c) during said shirring step (b), longitudinally moving the sleeve through the shirring zone and along the mandrel in the direction of the mandrel second end at a rate sufficient to resist the free longitudinal passage of shirred casing pleats from the shirring zone and towards the mandrel second end so that the pleats pack together and a length of shirred casing accumulates on the sleeve;
    (d) continuing said shirring of casing and longitudinally moving the sleeve until a desired length of shirred casing has accumulated on the sleeve; and then
    (e) separating the accumulated length of shirred casing from the unshirred tubular casing and longitudinally removing the separated length of shirred casing from the sleeve in the direction of the mandrel second end.

2. A method as in claim 1 wherein said mandrel has a first section slidably supporting the sleeve and an axially aligned compaction section which includes the second end of the mandrel, said method including the further steps of:

(f) longitudinally removing the separated accumulated length of shirred casing from the sleeve and onto the compaction section;

(g) applying an axial compacting force to the separated length of shirred casing at the compaction section to further compact the separated length; and thereafter (h) doffing the compacted length from the mandrel second end.

3. A method as in claim 2 including performing step (g) on a separated length of shirred casing while performing steps (b) and (c) to accumulate another shirred length on the sleeve.

4. A method as in claim 1 including adjusting the rate of withdrawing the sleeve to increase or decrease the resistance to the free passage of shirred casing pleats from the shirring zone.

5. A method as in claim 1 and after a desired length of shirred casing has accumulated on the sleeve, the steps of:

(f) longitudinally moving the sleeve towards the mandrel second end until a length of unshirred tubular casing is exposed between the shirred length and the shirring zone; and then (g) severing the exposed unshirred casing to separate the shirred length.

6. A method as in claim 5 including:

(h) longitudinally moving the sleeve during step (f) completely through the shirring zone; and then (i) severing the unshirred casing during step (g) at a position intermediate the sleeve and shirring zone.

7. A method as in claim 5 wherein severing of the unshirred casing from the shirred length occurs at a position spaced along the sleeve so that the sleeve remains partly disposed within the severed end of the unshirred casing.

8. A method as in claim 7 wherein severing is accomplished during the course of removing the shirred length from the sleeve.

9. A shirring machine comprising:

(a) a mandrel having a first end over which unshirred tubular casing is drawn for shirring and a second end from which shirred casing is doffed from the mandrel;

(b) a sleeve slidably disposed on said mandrel for longitudinal movement along said mandrel;

(c) shirring means disposed about said mandrel intermediate the ends thereof for shirring the unshirred tubular casing into pleats directly onto said sleeve;

(d) clamp means operable to hold said mandrel at a fixed longitudinal position relative to said shirring means during the shirring of the casing; and (e) drive means for moving said sleeve longitudinally along said mandrel and through the shirring means in the direction of said mandrel second end at a rate sufficient to resist the free passage of the pleats shirred casing from said shirring means so that the pleats of shirred casing pack together and accumulate on said sleeve.

10. A shirring machine as in claim 9 wherein said drive means for longitudinally moving said sleeve is controllable to increase or decrease the rate at which the sleeve is longitudinally moved for respectively decreasing or increasing the pack ratio of the shirred casing accumulated on said sleeve.

11. A shirring machine as in claim 9 wherein said mandrel includes a first section slidably supporting said sleeve and an axially aligned compaction section which includes the second end of said mandrel, the outside diameter of said compaction section being no larger than the outside diameter of said sleeve and the juncture of said mandrel compaction section and said mandrel first section defining a shoulder for butting against an end of said sleeve.

12. A shirring machine as in claim 11 including means for transferring a separated length of shirred casing from said sleeve and onto said compaction section when said sleeve end is butted against said shoulder 13. A shirring machine as in claim 9 including means operable after the accumulation of a desired length of shirred casing on said sleeve for separating the accumulated shirred length from the unshirred tubular casing.

14. A shirring machine as in claim 13 wherein said means for separating the accumulated length of shirred casing from the unshirred tubular casing is operable after said sleeve is spaced from said shirring zone, and includes a severing means for cutting the unshirred tubular casing at a point intermediate said shirring zone and said sleeve end.

15. A shirring machine as in claim 14 wherein said means for separating the length of shirred casing from the unshirred casing comprises a transfer means engagable against the shirred length for moving the shirred length from said sleeve and onto said compaction section thereby stretching and tearing the unshirred casing adjacent the shirred length as the shirred length is moved from said sleeve.

* * * * *